Figure 1:
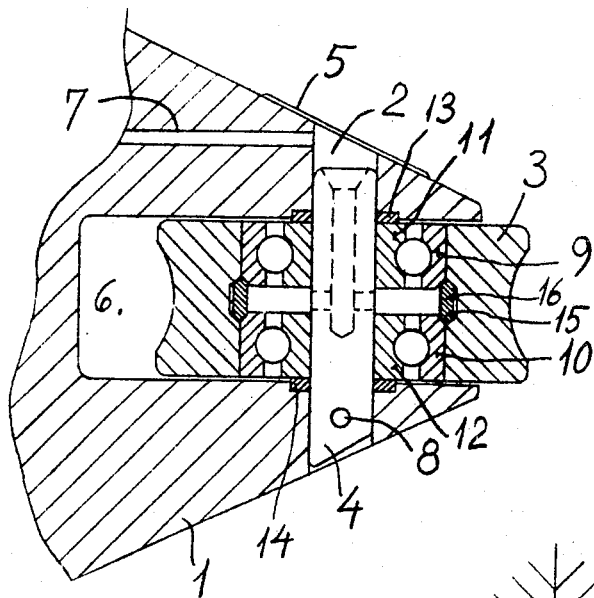

Aug. 27, 1968     E. JANSSON     3,399,003
DEVICE RELATING TO JOURNALLING OF IDLER SHEAVES, ROLLERS
OR THE LIKE, PARTICULARLY IDLER SHEAVE
GUIDES IN ROLLING MILLS
Filed Dec. 15, 1965

INVENTOR.
Elis Jansson
BY
Mason, Porter, Diller & Brown
ATTORNEYS

United States Patent Office 3,399,003
Patented Aug. 27, 1968

3,399,003
DEVICE RELATING TO JOURNALLING OF IDLER SHEAVES, ROLLERS OR THE LIKE, PARTICULARLY IDLER SHEAVE GUIDES IN ROLLING MILLS
Elis Jansson, Hagfors, Sweden, assignor to Uddeholms Aktiebolag, Uddeholm, Sweden, a joint-stock company of Sweden
Filed Dec. 15, 1965, Ser. No. 514,061
8 Claims. (Cl. 308—18)

The present invention relates to a device for accurately aligning idler sheaves, rollers, or the like with respect to their support or guide members to prevent frictional contact thereinbetween.

In idler sheave guides in rolling mills, it is of utmost importance that the idler sheaves be accurately journalled in their guides to eliminate the possibility of wobbling and/or frictional contact between the sheaves and their guides. To attain the required accuracy, it has heretofore been necessary to form a shoulder in the shaft bore of the idler sheave, the sides of the shoulder acting as bearing seats for a pair of idler sheave bearings mounted within the shaft bore on opposite sides of the shoulder. Alternately, it has been necessary to employ complicated bearing retainer structures having at least three retainer rings in the idler sheave hub, one retainer ring being placed between the outer races of the two idler sheave bearings, and the other two retainer rings being placed on the other side of a corresponding bearing, with the retainer rings being held in place by a plurality of set screws.

These prior art alignment means suffer from the obvious drawbacks of being complicated and costly. For example, when a shoulder is used, it is necessary to turn and grind both sides of the shoulder to precision tolerances in order to accurately seat the idler sheave bearings, and since this is performed in two operations, it is possible for the two bearing seats to become misaligned, thereby causing the idler sheave to wobble in operation, which shortens the life of the sheave and causes other difficulties.

Here is an object of this invention to provide a simple, inexpensive, accurate, and reliable means for aligning idler sheaves, rollers, or the like with respect to their support or guide members to eliminate the possibility of wobbling and/or frictional contact between the sheaves and their guides. In general terms, the alignment means of this invention comprises an annular groove formed in the shaft bore of an idler sheave, with a spacing ring engaged in the groove and extending radially therefrom. The groove and the spacing ring are dimensioned to accurately align a pair of idler sheave bearings which fit within the idler sheave shaft bore on either side of the spacing ring. The sides of the annular groove are sloped at an obtuse angle to the surface of the shaft bore, and the outer races of both bearings are beveled on the corner adjacent to the annular groove to form a substantially V-shaped surface of contact for the spacing ring, one-half of the V being formed by a sloping side of the annular groove, and the other half being formed by the beveled corner of the corresponding bearing. The spacing ring contacts only a portion of both sides of the V-shaped surface, whereby the bearings can be accurately spaced in different positions relative to the idler sheave by merely changing the thickness of the spacing ring. Also, by using a soft metal for the spacing ring, it is possible to accurately seat the bearings by force fitting, which is simple and inexpensive in comparison with the precision grinding operations which have heretofore been necessary to achieve the desired accuracy. Moreover, when the bearings become loose due to extensive wear, they can be easily remounted with a thicker spacing ring to prolong the useful life of the idler sheave.

Figure 2:
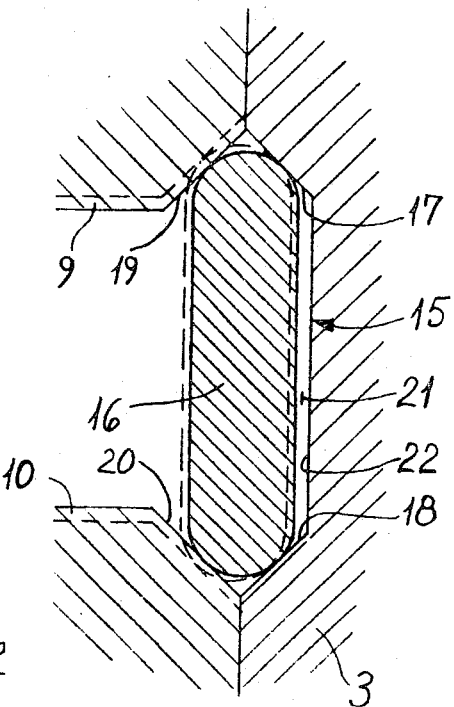

Other objects and advantages of the invention will become apparent to those skilled in the art from the following description of one specific embodiment of the invention, as illustrated in the attached drawings, in which:

FIGURE 1 is an axial cross-sectional view of an idler sheave bearing assembly of this invention journalled within an opening in an idler sheave guide for rotation about a vertical axis; and FIGURE 2 is an enlarged view of the spacing ring 16 of FIGURE 1 showing the V-shaped contact surface formed by the sloping sides of the annular groove in the idler sheave shaft bore and by the beveled corners of the idler sheave bearings.

In the drawing 1 denotes a portion of the body of the idler sheave guide, having a bore 2 for the shaft 4 of an idler sheave 3. A cover plate 5 is fitted over the bore 2, an opening 6 is provided for the idler sheave 3, and a channel 7 is provided for oil or grease. 8 denotes a guide pin for the shaft 4, and 9 and 10 denote the outer races of two antifriction bearings of ball type disposed in the shaft bore or bearing hole. The inner races 11 and 12 of the bearings engage the shaft 4. 13 and 14 denote two retainer plates disposed outside each of the two inner races in the material of the sheave guide body 1. The retainer plates project slightly from their sockets to assure free rotation of the idler sheave 3 and the antifriction bearings with a certain play in the cavity 6.

15 denotes a peripheral groove in the periphery of the shaft or hub bore of the idler sheave, cut out, e.g., by turning, grinding or the like, in which groove a spacing ring 16 is inserted.

In accordance with the principle of the present invention, the sides 17 and 18 of the groove 15 form obtuse angles with the groove bottom 22 and are adapted to support spacing ring 16 without the latter contacting the groove bottom. On the drawing a space is visualized, denoted 21, between the spacing ring 16 and the groove bottom 22. The ring 16 also abuts against the inner shoulders of outer races 9 and 10 of the anti-friction bearings.

The angles between the sides 17 and 18 on one side and the groove bottom on the other are suitably in the range of 120–150°, preferably about 135°, and the bevelled surfaces 19 and 20 likewise form angles of 135° with the abutting sides, whereby the angles between the surfaces of the bevels and the sides of the groove are nearly 90° in this particular embodiment of the invention.

Since the sloping groove sides 17 and 18 support ring 16, the latter will be seated in its intended position extremely firmly and accurately and accordingly fix the positions of the races with great exactitude. Variation of the distance between the races can be attained in the most simple way by choosing differently sized distance or space rings 16 in accordance with the invention.

While one form of the invention has been shown for purposes of illustration, it is to be understood that various changes in the details of construction and arrangement of parts may be made without departing from the spirit and scope of the invention as defined in the appended claims.

What I claim is:

1. A sheave bearing assembly comprising a sheave having a central bore formed therein, an annular stationary groove formed in the central portion of the sheave and extending radially outward from said bore, an annular spacing ring engaged in said annular groove and projecting radially inwardly therefrom, a pair of anti-friction bearings within said bore, one on either side of said spacing ring, each of said anti-friction bearings including inner and outer race members, the inner shoulder of each outer race member abutting against said spacing ring, and said annular groove and spacing ring being so dimensioned as to accurately align said anti-friction bearings with respect to said sheave when the inner shoulders of said outer race members are in contact with said spacing ring.

2. A sheave bearing assembly as defined in claim 1 wherein said annual groove comprises a recessed channel extending around the periphery of said bore in the central portion thereof, said recessed channel having a bottom and two sloping side edges extending therefrom at an obtuse angle thereto, a peripheral bevel formed on each of said outer race members adjacent to the corresponding side edge of said recessed channel, and said spacing ring being so dimensioned as to contact only a portion of the surface of said side edges and said peripheral bevels.

3. A sheave bearing assembly as defined in claim 2 wherein the side edges of said spacing ring are rounded so as to contact only a portion of the surface of said side edges and said peripheral bevels.

4. A sheave bearing assembly as defined in claim 3 and also including a sheave guide having an opening formed therein to receive said sheave bearing assembly, means for journalling said sheave within the opening in said sheave guide, and means for spacing the inner races of said anti-friction bearings from the corresponding surfaces of said opening to prevent frictional contact between said sheave and said sheave guide.

5. The combination defined in claim 4 wherein said sheave bearing assembly is journalled within said opening by means of a shaft attached to said sheave guide and extending through said opening within the inner races of said anti-friction bearings, and wherein the inner races of said anti-friction bearings are spaced from the corresponding surfaces of said sheave guide by means of second and third spacing rings each extending between the inner shoulder of a corresponding inner race and the adjacent surface of said sheave guide.

6. A sheave bearing assembly as defined in claim 1 wherein said spacing ring is made of a metal chosen from the group comprising soft steel, copper, brass, bronze, other types of so-called red metals, aluminum, magnesium alloys, and other light metals.

7. A sheave bearing assembly as defined in claim 2 wherein the obtuse angle between said side edges and the bottom of said channel is greater than 120° and less than 150°.

8. A sheave bearing assembly as defined in claim 7 wherein the obtuse angle between said side edges and the bottom of said channel is equal to approximately 135°.

References Cited

UNITED STATES PATENTS

| | | | |
|---|---|---|---|
| 1,364,675 | 1/1921 | Almfelt | 308—189 |
| 1,918,677 | 7/1933 | Wingquist | 308—214 |
| 2,703,261 | 3/1955 | Beck et al. | 308—18 |

MARTIN P. SCHWADRON, *Primary Examiner.*

G. N. BAUM, *Assistant Examiner.*